(12) United States Patent
Schwartz

(10) Patent No.: US 10,020,530 B2
(45) Date of Patent: Jul. 10, 2018

(54) FUEL CELL

(75) Inventor: Stephan Schwartz, Vaxholm (SE)

(73) Assignee: POWERCELL SWEDEN AB, Göteborg (SE)

( * ) Notice: Subject to any disclaimer, the term of this patent is extended or adjusted under 35 U.S.C. 154(b) by 2526 days.

(21) Appl. No.: 10/528,457

(22) PCT Filed: Sep. 17, 2003

(86) PCT No.: PCT/SE03/01456
§ 371 (c)(1),
(2), (4) Date: Oct. 18, 2005

(87) PCT Pub. No.: WO2004/027910
PCT Pub. Date: Apr. 1, 2004

(65) Prior Publication Data
US 2006/0147779 A1    Jul. 6, 2006

(30) Foreign Application Priority Data
Sep. 25, 2002  (SE) ....................... 0202795

(51) Int. Cl.
*H01M 8/00* (2016.01)
*H01M 8/04* (2016.01)
*H01M 8/2483* (2016.01)
*H01M 8/0258* (2016.01)
*H01M 8/241* (2016.01)
(Continued)

(52) U.S. Cl.
CPC ....... *H01M 8/2483* (2016.02); *H01M 8/0258* (2013.01); *H01M 8/241* (2013.01); *H01M 8/2465* (2013.01); *H01M 8/0247* (2013.01)

(58) Field of Classification Search
CPC ....................................... H01M 8/04
USPC ............................................ 429/34
See application file for complete search history.

(56) References Cited

U.S. PATENT DOCUMENTS

| 4,476,197 | A | * | 10/1984 | Herceg | ............... | H01M 8/2435 429/456 |
| 5,240,785 | A | * | 8/1993 | Okamura | ............ | H01M 12/065 429/142 |
| 5,288,562 | A | | 2/1994 | Taniguchi et al. | | |

(Continued)

FOREIGN PATENT DOCUMENTS

| JP | 5109415 | 4/1993 |
| JP | 7135005 | 5/1995 |

(Continued)

OTHER PUBLICATIONS

International Search Report from PCT/SE03/01456.
(Continued)

*Primary Examiner* — Daniel S Gatewood
(74) *Attorney, Agent, or Firm* — WRB-IP LLP

(57) ABSTRACT

A fuel cell includes an electrolyte provided with electrodes in the form of an anode and a cathode on opposite sides of the electrolyte, and a system of flow ducts arranged so as to bring a first flow containing a first reactant into contact with an active surface on the anode and to bring a second flow containing a second reactant into contact with an active surface on the cathode. The system of flow ducts includes a distribution arrangement adapted to distribute a flow incoming to the active surface uniformly over an inlet region which extends along the active surface.

29 Claims, 7 Drawing Sheets

(51) Int. Cl.
*H01M 8/2465* (2016.01)
*H01M 8/0247* (2016.01)

(56) References Cited

U.S. PATENT DOCUMENTS

| | | | |
|---|---|---|---|
| 5,686,562 A | | 11/1997 | Cavalca et al. |
| 5,773,160 A | * | 6/1998 | Wilkinson et al. ........... 429/434 |
| 5,804,326 A | * | 9/1998 | Chow ................. H01M 8/0228 |
| | | | 429/437 |
| 5,863,671 A | * | 1/1999 | Spear, Jr. .............. F28D 9/0075 |
| | | | 429/413 |
| 5,863,672 A | | 1/1999 | Nolte et al. |
| 6,296,964 B1 | * | 10/2001 | Ren .................... H01M 8/0254 |
| | | | 429/431 |
| 6,416,899 B1 | * | 7/2002 | Wariishi ............. H01M 8/2465 |
| | | | 429/446 |
| 6,458,479 B1 | * | 10/2002 | Ren et al. ....................... 429/33 |

FOREIGN PATENT DOCUMENTS

| | | |
|---|---|---|
| JP | 10233221 | 9/1998 |
| JP | 10510390 | 10/1998 |
| JP | 11185778 | 7/1999 |
| JP | 2002203578 | 7/2002 |
| WO | WO9957781 | 11/1999 |
| WO | WO0161777 | 8/2001 |
| WO | WO02069424 | 9/2002 |

OTHER PUBLICATIONS

Translation of Official Action from corresponding Japanese Patent Application 2004-538104.
Translation of Official Action dated Jul. 29, 2010, from corresponding Japanese Patent Application 2004-538104.

* cited by examiner

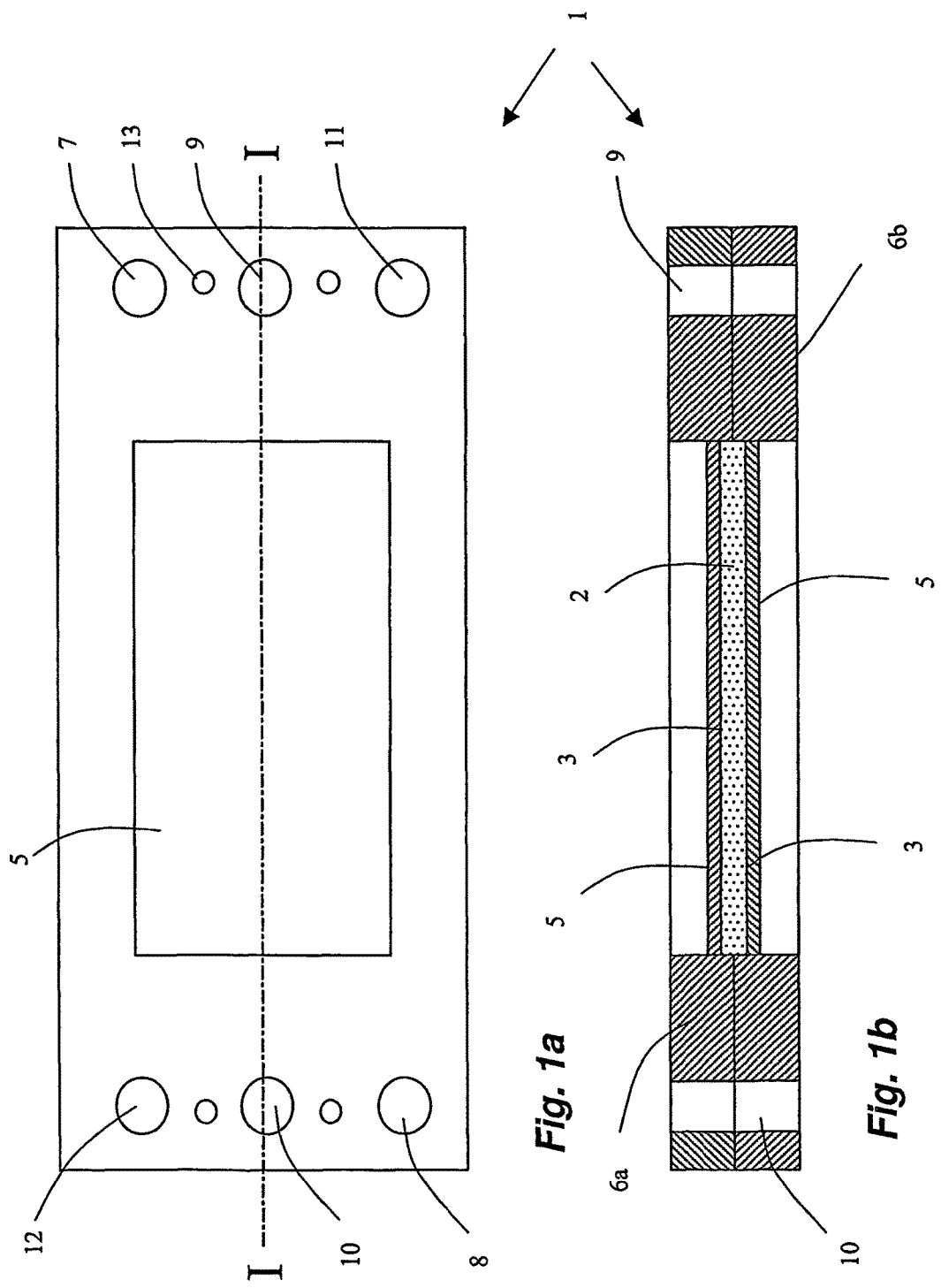

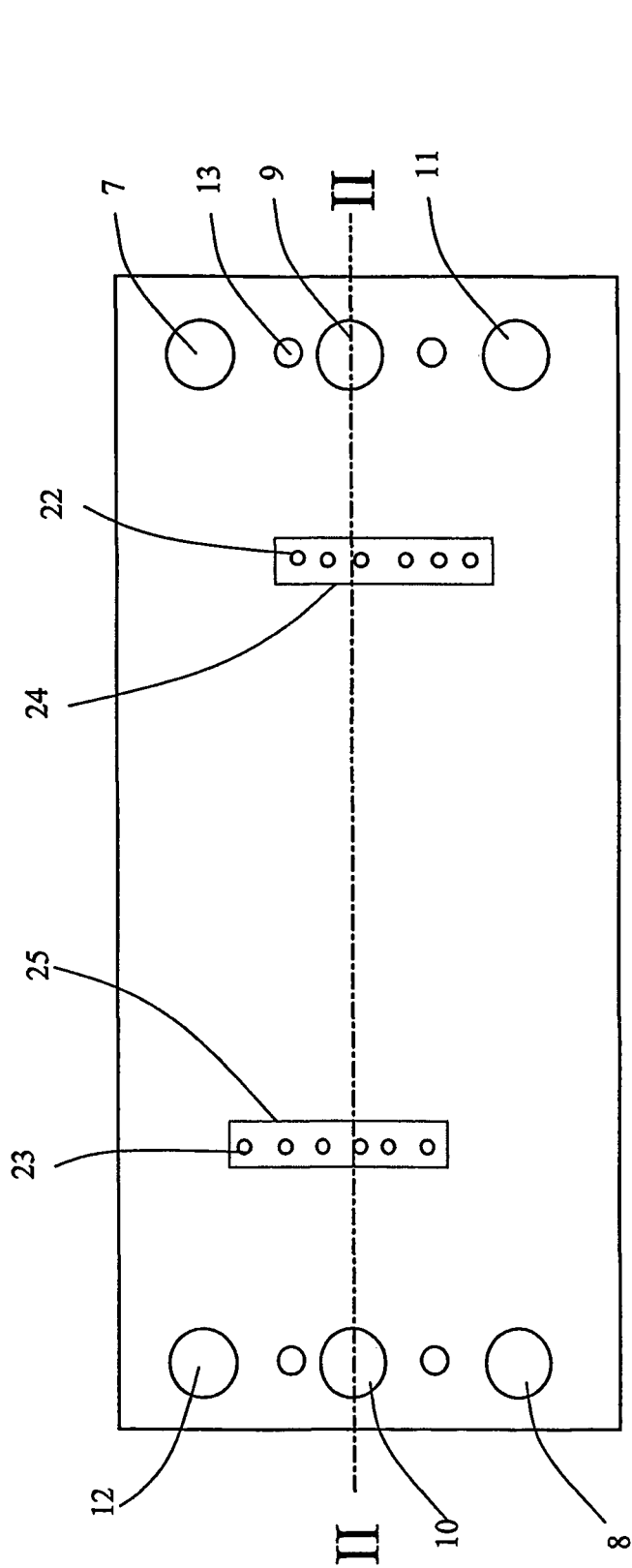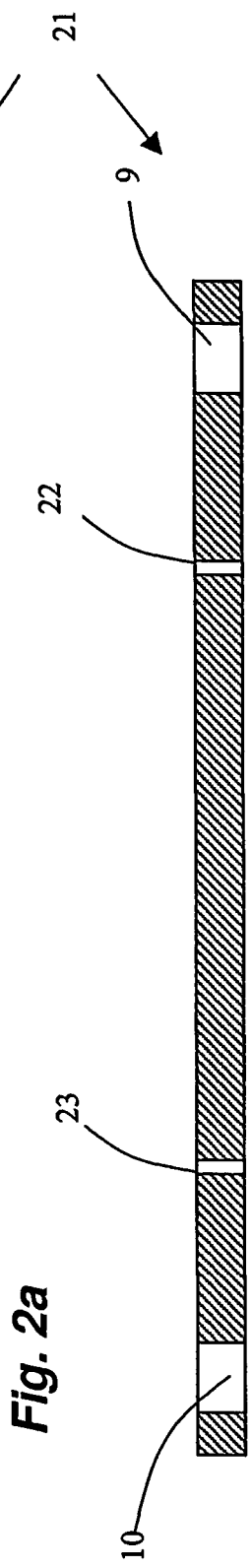
Fig. 2a
Fig. 2b

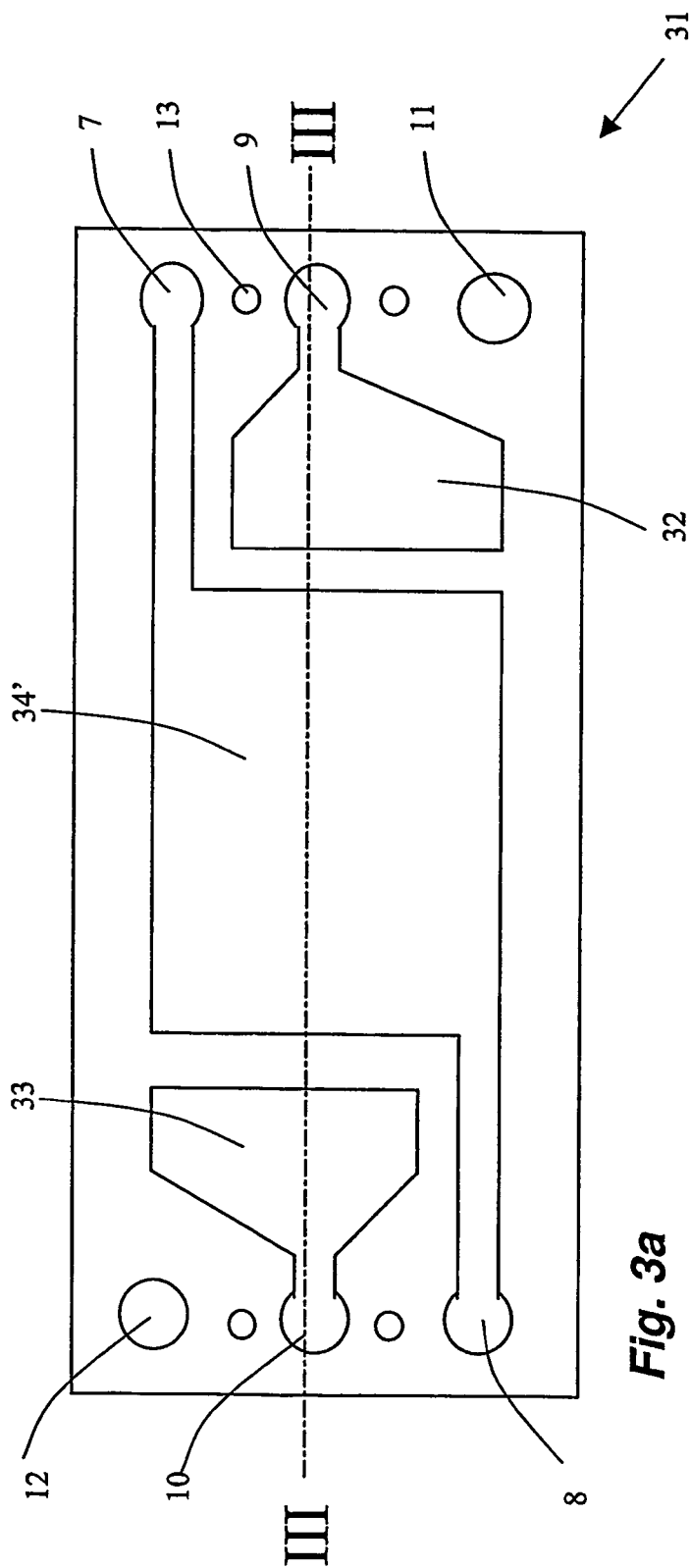
Fig. 3a
Fig. 3b

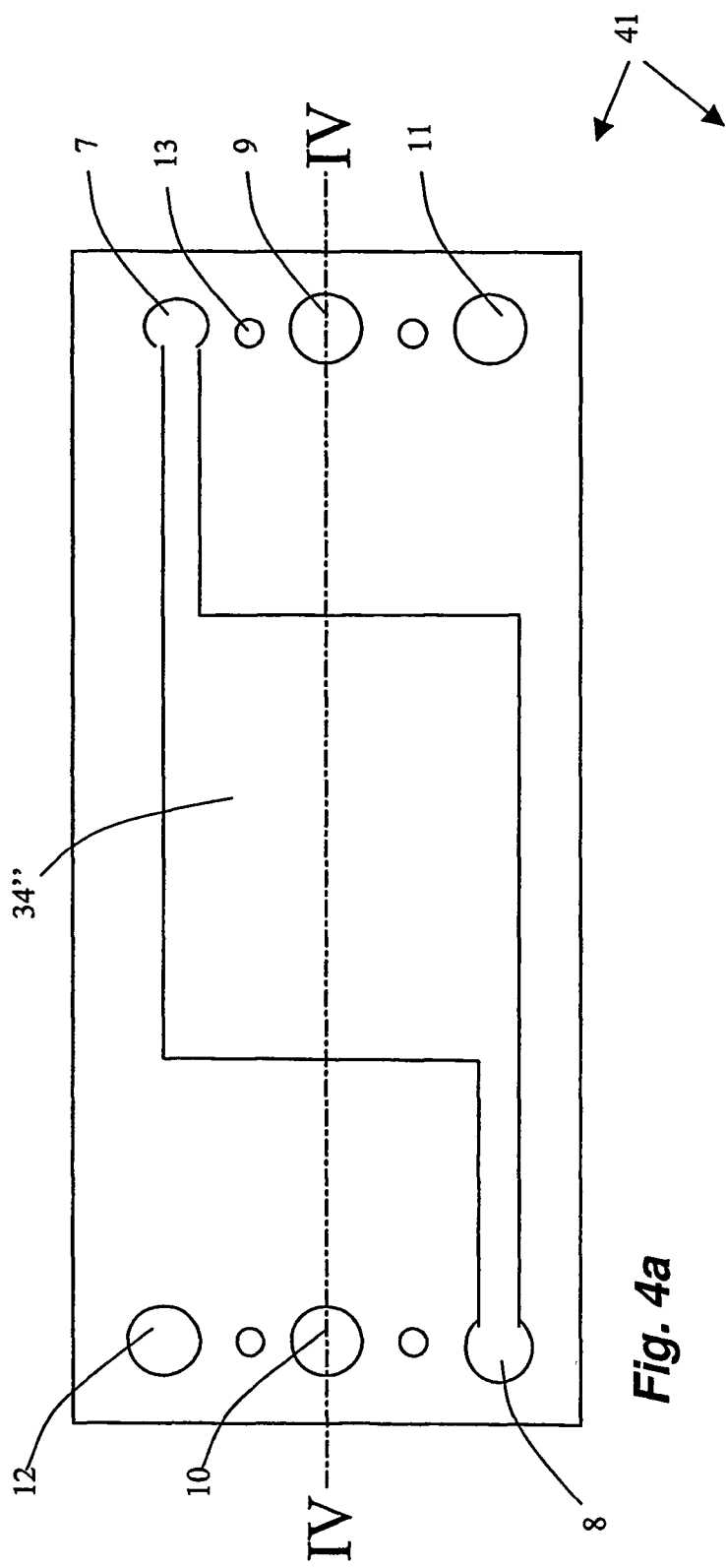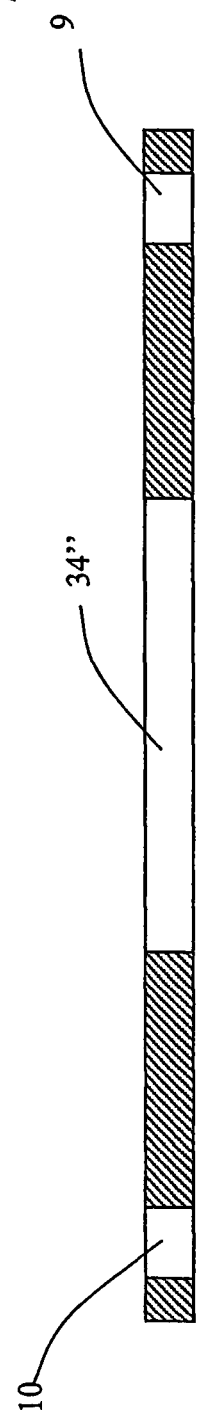
Fig. 4a
Fig. 4b

FUEL CELL

TECHNICAL FIELD

The present invention relates to a fuel cell according to the preamble of patent claim 1 below.

STATE OF THE ART

Fuel cells convert fuels and oxidizing agents electrochemically into electrical energy (electric current). This takes place without combustion, and electrical energy is produced as long as fuel and oxidizing agent are supplied. The reaction product is pure water. Fuel cells represent an interesting alternative to, for example, ordinary internal combustion engines owing to the fact that the technology is clean, silent, very efficient and free from moving parts. Examples of suitable applications for fuel cells are propulsion of vehicles and electric power generation in stationary installations and mobile power generation units such as, for example, APUs (Auxiliary Power Units).

A fuel cell consists of two electrodes, an anode and a cathode, between which an ion-conducting electrolyte is arranged. Fuel cells can be categorized on the basis of what the ion-conducting electrolyte consists of. Examples of fuel cell types are PEFC (Polymer Electrolyte Fuel Cell, or Proton Exchange Fuel Cell), AFC (Alkaline Fuel Cell), PAFC (Phosphoric Acid Fuel Cell) and SOFC (Solid Oxide Fuel Cell). The category PEFC may also be referred to as, for example, SPFC (Solid Polymer Fuel Cell) or PEM fuel cell (Proton Exchange Membrane).

In a PEFC, for example, electrodes and electrolyte are usually assembled into what is known as an MEA (Membrane Electrode Assembly). Fuel cells are often constructed in a layer structure where the MEA constitutes, or is comprised in, one of the layers. Other layers are designed for inter alia bringing about the distribution of fuel, oxidizing agent, reaction products and, where appropriate, coolant.

In a fuel cell with a proton-conducting membrane as the electrolyte (PEM fuel cells), the chemical energy in a fuel, such as hydrogen gas, and an oxidizing agent, such as air/oxygen, is converted directly into electrical energy. In a cell space at the active surface of the anode, the fuel is supplied and is broken down into hydrogen ions (protons) and electrons. The electrons are conducted via the anode to an external electric circuit, and hydrogen ions are transported through the electrolyte/the membrane to the cathode. In a cell space at the active surface of the cathode, the oxidizing agent is supplied and reacts with the hydrogen ions, forming heat and water. The external electric circuit can be used for, for example, driving a vehicle, charging batteries, or driving peripheral equipment in vehicles or other applications. A number of fuel cells are usually assembled into what is known as a fuel cell stack in order for it to be possible to deliver sufficiently high power and/or voltage for the application concerned. It must be possible for generated current to be conducted from cell to cell through the stack.

In order to make fuel cells commercially viable, it is necessary inter alia that the manufacturing costs are sufficiently low and that the efficiency, that is to say the electrical energy/chemical energy conversion ratio, is sufficiently high. High efficiency results in it being possible to the keep the weight and volume of a fuel cell stack low. This is of additional importance in vehicle applications where the weight influences fuel consumption and other performance to a great extent and where the available space is limited. Increased efficiency also means that a smaller electrode/membrane surface area is required for a given power, which thus reduces the quantity of electrode/membrane material necessary. As such material is normally very expensive, increased efficiency can contribute to a significant reduction in the manufacturing costs.

In conventional fuel cells, the fuel/the oxidizing agent is supplied to the electrode surface via an inlet positioned in one corner of the MEA. The outlet is positioned in the diagonally opposite corner of the MEA, and the cell space itself consists of a number of thin grooves hollowed out in a layer positioned at the MEA, usually in what is known as a bipolar plate. These grooves form flow ducts which run along the electrode surface in a relatively complicated pattern between inlet and outlet. The parts of the bipolar plate which are not provided with grooves are in contact with the active surface and conduct electric current from or to the electrode. One disadvantage of this type of construction is that the narrow ducts are easily blocked by gas, water or dirt, and, furthermore, a relatively large part of the active surface of the MEA is covered by the parts of the bipolar plate which are not provided with any grooves. Altogether, this leads to a significant proportion of the active surface not being accessible for the flow and therefore to a significant proportion of the active surface not being used for electric power production. Moreover, the grooves in the MEA result in the contact pressure between the latter and the bipolar plate being worse than at the side, which leads to inferior conductivity and holding-together of the stack. Another disadvantage is that a part of the MEA is usually used for sealing outside the region with hollowed-out grooves, which means that further parts of the MEA will not be of use for electric power production. Furthermore, said type of groove requires a complicated and thus expensive manufacturing process. Use is usually made of various arrangements of packings between layers and cells in order to ensure that the stack is sealed to the outside and that the various flows are not mixed. In order to guarantee tightness and good conductivity through the stack, good holding-together of layers and packings is required. This is normally achieved by pressure from the end walls, for example brought about by through-bolts. As packings often settle with time, the problem of gas leakage occurring and the conductivity being impaired is relatively common.

JP 11283636 describes another type of construction where the cell space is formed in a number of parallel slots designed in a separate layer which is arranged between the MEA and an inlet/outlet layer. Inlet to and outlet from the cell space/slots takes place via two elongate cavities in the inlet/outlet layer, which cavities are positioned at right angles to the slots at the ends of the slots. A hole at the end of one cavity allows inlet of fuel or oxidizing agent for onward transport to the parallel slots. After having passed through the slots, the flow is conducted out via the other cavity, which is provided with an outlet hole positioned at the end. As described above, the inlet and outlet holes are located in diagonally opposite corners of the MEA. The design of the various flow ducts in the proposed construction is considered to afford manufacturing advantages in comparison with prior art. As JP 11283636 deals exclusively with problems related to the manufacturing process for layer-constructed fuel cells, functions associated with, for example, efficiency or utilization of the electrode surface are not described or discussed. The document gives no indication of insights into problems within these areas. It is nevertheless possible to gather from the description that a relatively large proportion of the electrode surface, the proportion located between the slots, is of difficult access for the flows and thus contributes only marginally to the electric power production.

The temperature is of importance for the functioning of a fuel cell. Generated heat must be dissipated from the cell/the stack in order that the temperature does not become too high. On the one hand, a high temperature is desirable for increased reaction rate but, on the other hand, there are maximum temperature levels which must not be exceeded. This is particularly important for a PEFC as the membrane can be damaged by high temperatures. A number of separate cooling units are usually arranged at a distance from one another in the stack in such a way that a series of a number of cells, often 5-7, is followed by a cooling unit etc.

SUMMARY OF THE INVENTION

A first object of the present invention is to provide a fuel cell which is improved in comparison with prior art, in particular with regard to efficiency and cost-effective manufacturing. This object is achieved by means of a device, the features of which emerge from patent claim 1 below. A second object of the invention is to provide a fuel cell stack which is improved in comparison with prior art. This object is achieved by means of a device, the features of which emerge from patent claims below. Other patent claims describe advantageous developments and variants of the invention.

The invention constitutes a fuel cell comprising an electrolyte provided with electrodes in the form of an anode and a cathode on opposite sides of the electrolyte, and a system of flow ducts arranged so as to bring a first flow containing a first reactant into contact with an active surface on the anode and to bring a second flow containing a second reactant into contact with an active surface on the cathode. The invention is characterized in that the system of flow ducts comprises a distribution arrangement adapted to distribute a flow incoming to the active surface uniformly over an inlet region which extends along the active surface. In order to achieve high efficiency, it is necessary for it to be possible for the active surface at the electrode/the membrane to undergo maximum utilization, which presupposes a favorable flow pattern for fuel and oxidizing agent. By means of the invention, a uniform and spread-out and thus favorable flow distribution in to the electrode surface is obtained, which affords good opportunities for utilizing the electrode surface in a very effective way. The efficiency can thus be improved, which results in increased power per unit of electrode area. This can be used in order to increase the total available power or to reduce the total quantity of electrode/electrolyte in order to reduce manufacturing costs. Furthermore, the wide inlet region according to the invention allows greater freedom in designing the cell space. The present invention consequently differs considerably from conventional fuel cells where the flow is conducted in to the active surface via a hole in the corner. The present invention also differs considerably from JP 11283636, the flow pattern of which, as far as it is possible to gather from the description, can be described like this: when the flow via the inlet hole has flowed in at the end of the cavity, a large part of the total flow will flow through the parallel slot which is located closest to the inlet hole, a somewhat smaller part of the total flow will flow through the next parallel slot etc., while a small part of the total flow will flow through the slot which is located furthest from the inlet hole. The result is therefore a non-uniform flow distribution over the active electrode surface, which results in different reaction conditions for different parts of the electrode. Such a flow pattern leads to difficulties in optimizing the process and can moreover result in shortened life on account of, for example, uneven wear and drying out especially on the cathode side. In contrast to JP 11283636, the present invention provides uniform and spread-out flow distribution in to and over the electrode surface.

In a first preferred embodiment of the invention, the inlet region extends along at least approximately half of, preferably essentially the whole of, the extent of the active surface in the lateral direction or vertical direction. The inlet region is preferably located adjacent to one of the delimitations of the active surface. In this way, very advantageous inflow to the active surface is obtained.

In a second preferred embodiment of the invention, the system of flow ducts comprises a collecting arrangement adapted to allow a flow outgoing from the active surface to leave the active surface within an outlet region which extends along, preferably at least half of, preferably essentially the whole of, the active surface. In this way, the flow pattern over the active surface is improved further. Furthermore, such a design allows great freedom in the design of the cell space at the active surface; in addition to different variants of, for example, grooves and slots, the cell space can now consist of a homogeneous volume because the wide inlet and the wide outlet according to the invention can be used to guarantee a favorable flow pattern over the active surface and thus to ensure great effectiveness. The outlet region is suitably located adjacent to a delimitation of the active surface opposite the inlet region, and the inlet region and the outlet region are suitably essentially parallel to one another.

In a third preferred embodiment of the invention, the distribution arrangement comprises a distribution chamber which extends in the direction along the active surface, and at least one inlet opening which allows conveying-in of said flow from the distribution chamber to the active surface, said at least one inlet opening defining the inlet region. The distribution chamber and the at least one inlet opening are preferably designed to provide a greater flow resistance through the at least one inlet opening than through the distribution chamber. In this way, the flow is distributed well in the distribution chamber before, well-distributed, it passes through the opening/the openings and enters the cell space. Such a construction can easily be modified by changing the number, size and shape of the opening(s). This is advantageous for, for example, adapting pressure drop in new installations.

An advantageous solution is that the active surface extends essentially in a first plane and that the distribution chamber extends essentially in a second plane, which second plane is essentially parallel to the first plane and is located at a distance from the first plane, and that the distribution chamber extends at least partly over a region to which, in the first plane, the active surface corresponds. In this way, the distribution chamber/the duct system occupies less space at the side of the electrode/the electrolyte, which results in the front surface of the cell/the stack becoming smaller. This is of significance for the possibility of adapting the physical shape of a fuel cell stack to the available space in certain applications. Furthermore, the task of bringing about the connection to the cell space is simplified, and an opportunity is moreover afforded for providing a second inlet region which is positioned closer to the outlet region. In this way, a "fresh" flow of reactant can be added downstream in the cell space.

In a fourth preferred embodiment of the invention, the fuel cell is formed of a layer structure comprising a first layer in which the active surface is located, a second layer provided with said at least one inlet opening, and at least one further layer, where the second layer is located between the first layer and the at least one further layer, the second layer and the at least one further layer constituting limiting surfaces for the distribution chamber. Such a layer structure is advantageous for several reasons. As far as manufacturing is concerned, it is, for example, relatively simple to machine individual layers compared with a more solid construction where, for example, punching cannot be used. Furthermore, an opportunity is afforded for using different materials in different layers, which can be made use of both for simplifying, manufacturing and improving functioning. The layer structure is also advantageous for test-running/adaptation of an installation because the individual layers can be exchanged or modified simply. A further advantage of this embodiment of the invention is that the different layers interact in an ingenious way; for example, the distribution chamber is formed between the second layer and the at least one further layer when the layers are assembled, which means that a relatively complicated system of flow ducts and chamber can be formed in spite of the fact that the machining of the individual layers is relatively simple. The distribution chamber preferably consists at least partly of a cavity in the second layer and/or the at least one further layer. In an advantageous variant, the at least one further layer comprises a third layer and a fourth layer, the distribution chamber consisting at least partly of a through-cutout in the third layer, the second layer constituting a limiting surface for the distribution chamber in one direction, and the fourth layer constituting a limiting surface for the distribution chamber in the opposite direction.

The layer structure is suitably designed so that the second layer constitutes a delimiting surface in a cell space at the active surface, and that the second layer constitutes a delimitation between the cell space and the distribution chamber, and that the second layer is provided with at least one opening, which at least one opening allows communication between the distribution chamber and the cell space and forms the at least one inlet opening.

The second layer is preferably located at a distance from the active surface. In this way, the cell space can consist of the interspace which is formed between the second layer and the active surface. Costly and time-consuming work for producing grooves, for example, is therefore eliminated, and, furthermore, no extra cell-space-forming layers in the form of, for example, slots are required. Together with the control of the flow pattern described above, the invention makes possible very effective utilization of an active surface located in an "open" cell space.

In a preferred variant of the invention according to the layer structure, the system of flow ducts comprises a coolant distribution system, a cooling chamber being arranged in the at least one further layer. In this way, cooling of each cell in the stack is allowed. This provides very good control of the temperature in the stack and means that a uniform temperature distribution can be obtained and that the operating temperature can be kept close to the maximum permitted temperature in order to obtain the maximum possible power. The cooling chamber preferably consists at least partly of a through-cutout in the at least one further layer, the second layer constituting a limiting surface for the cooling chamber.

BRIEF DESCRIPTION OF FIGURES

The invention will be described in greater detail below with reference to the following figures, in which:

FIG. 1a shows schematically a plan view of a first layer in a preferred embodiment of the invention where the invention is constructed according to a layer structure;
FIG. 1b shows a cross section I-I according to FIG. 1a;
FIG. 2a shows schematically a plan view of a second layer according to the preferred embodiment;
FIG. 2b shows a cross section II-II according to FIG. 2a;
FIG. 3a shows schematically a plan view of a third layer according to the preferred embodiment;
FIG. 3b shows a cross section III-III according to FIG. 3a;
FIG. 4a shows schematically a plan view of a fourth layer according to the preferred embodiment;
FIG. 4b shows a cross section IV-IV according to FIG. 4a;
FIG. 5b shows a cross section V-V according to FIG. 5a.

DESCRIPTION OF EXEMPLARY EMBODIMENTS

Figure 5A:
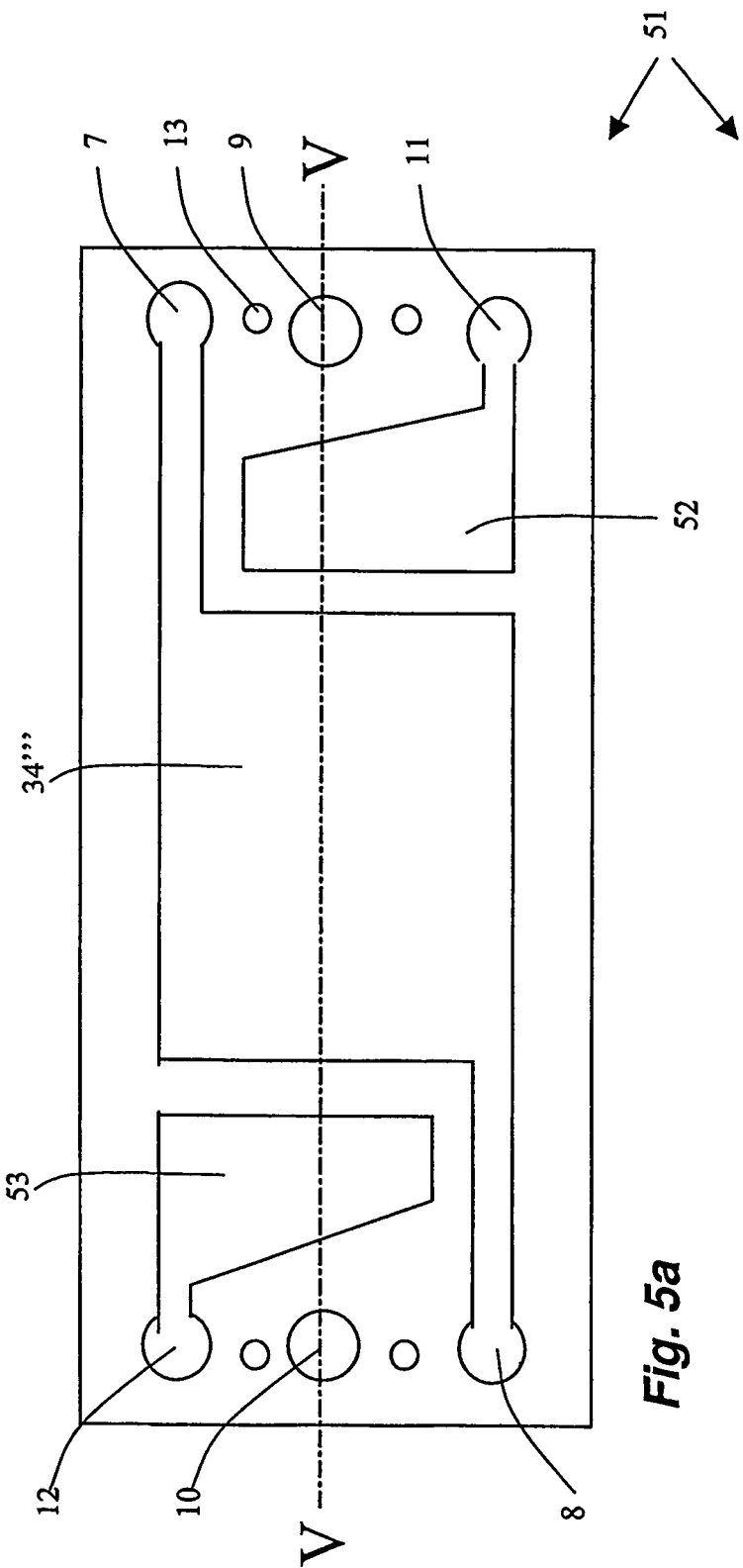
FIG. 5a shows schematically a plan view of a fifth layer according to the preferred embodiment.

The invention will now be described in a preferred embodiment in which the invention is constructed according to a layer structure. Such a construction is favorable in manufacturing terms.

The expression system of flow ducts means all ducts, chambers, connections, spaces etc. which are intended for conducting a flow of any kind.

The expression active surface means the surface on or at an electrode surface where the chemical reactions in the main take place.

FIG. 1a shows schematically a plan view of a first layer 1, and FIG. 1b shows a cross section I-I according to FIG. 1a. The first layer 1 comprises a plate-shaped construction, sometimes referred to as an MEA, consisting of an electrolyte 2 and two electrodes 3, an anode and a cathode, on opposite sides of the electrolyte 2. The outer surface 5 of each electrode, referred to as the active surface 5 below, is intended to be brought into contact with a reactive medium during operation of the fuel cell. The electrodes 3 usually comprise catalytic material (not shown) and are usually coated with gas diffusion layers (not shown) in order to force the gas toward the catalytic electrode. The electrolyte 2 and the electrodes 3 are connected to a surrounding and sealing distance element 6 in such a way that the active surface 5 is let into the distance element 6. Furthermore, the first layer is provided with a number of through-cutouts: main duct for incoming coolant 7; main duct for outgoing coolant 8; main duct for an incoming first flow 9; main duct for an outgoing first flow 10; main duct for an incoming second flow 11; main duct for an outgoing second flow 12, and a number of bolt holes 13 (in this example four) in order to make it possible to draw the layer structure together by means of bolts.

In the schematic FIG. 1, the distance element 6 is divided into two parts, 6a and 6b, in order to indicate that the first layer 1 can be constructed in various ways and, for example, consist of a number of part layers. For example, it is possible to allow the electrolyte 2 to continue part way in between the two parts 6a and 6b and to bring about sealing with arrangements of spacers and packing material.

FIG. 2a shows schematically a plan view of a second layer 21, and FIG. 2b shows a cross section II-II according to FIG. 2a. The second layer 21 is, like the first layer 1, provided with a number of through-cutouts 7-13 in accordance with the description above. The second layer 21 is also provided with a number of inlet openings 22 (six in this example) and a number of outlet openings 23 (six in this example) in the form of holes. The inlet openings 22 and the outlet openings 23 are distributed over a distance in the vertical direction of the figure (FIG. 2a) in such a way that they define an inlet region 24 and, respectively, an outlet region 25 which extend in the vertical direction of the figure (FIG. 2a). The function of these openings 22, 23 and regions 24, 25 is described below.

FIG. 3a shows schematically a plan view of a third layer 31, and FIG. 3b shows a cross section III-III according to FIG. 3a. The third layer 31 is, like the first layer 1 and the second layer 21, provided with a number of through-cutouts 7-13 in accordance with the description above. The third layer 31 is also provided with a first distribution chamber 32 which communicates with the main duct for an incoming first flow 9, a first collecting chamber 33 which communicates with the main duct for an outgoing first flow 10, and a first cooling chamber 34' which communicates with the main ducts for incoming and outgoing coolant 7, 8.

FIG. 4a shows schematically a plan view of a fourth layer 41, and FIG. 4b shows a cross section IV-IV according to FIG. 4a. The fourth layer 41 is, like the layers described previously, provided with a number of through-cutouts 7-13 in accordance with the description above. The fourth layer 41 is also provided with a second cooling chamber 34'' which communicates with the main ducts for incoming and outgoing coolant 7, 8.

Figure 5B:
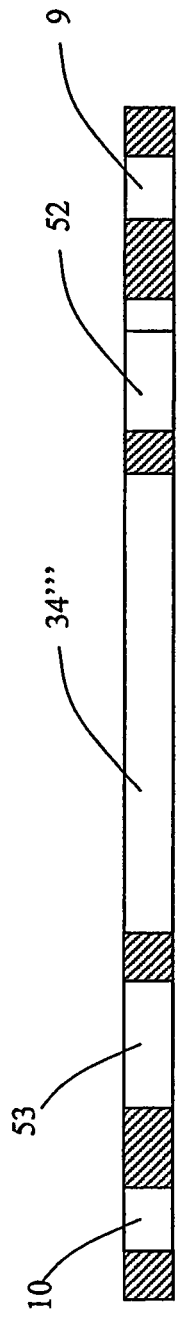

FIG. 5a shows schematically a plan view of a fifth layer 51, and FIG. 5b shows a cross section V-V according to FIG. 5a. The fifth layer 51 is, like the layers described previously, provided with a number of through-cutouts 7-13 in accordance with the description above. The fifth layer 51 is also provided with a second distribution chamber 52 which communicates with the main duct for an incoming second flow 11, a second collecting chamber 53 which communicates with the main duct for an outgoing second flow 12, and a third cooling chamber 34''' which communicates with the main ducts for incoming and outgoing coolant 7, 8.

Figure 6:
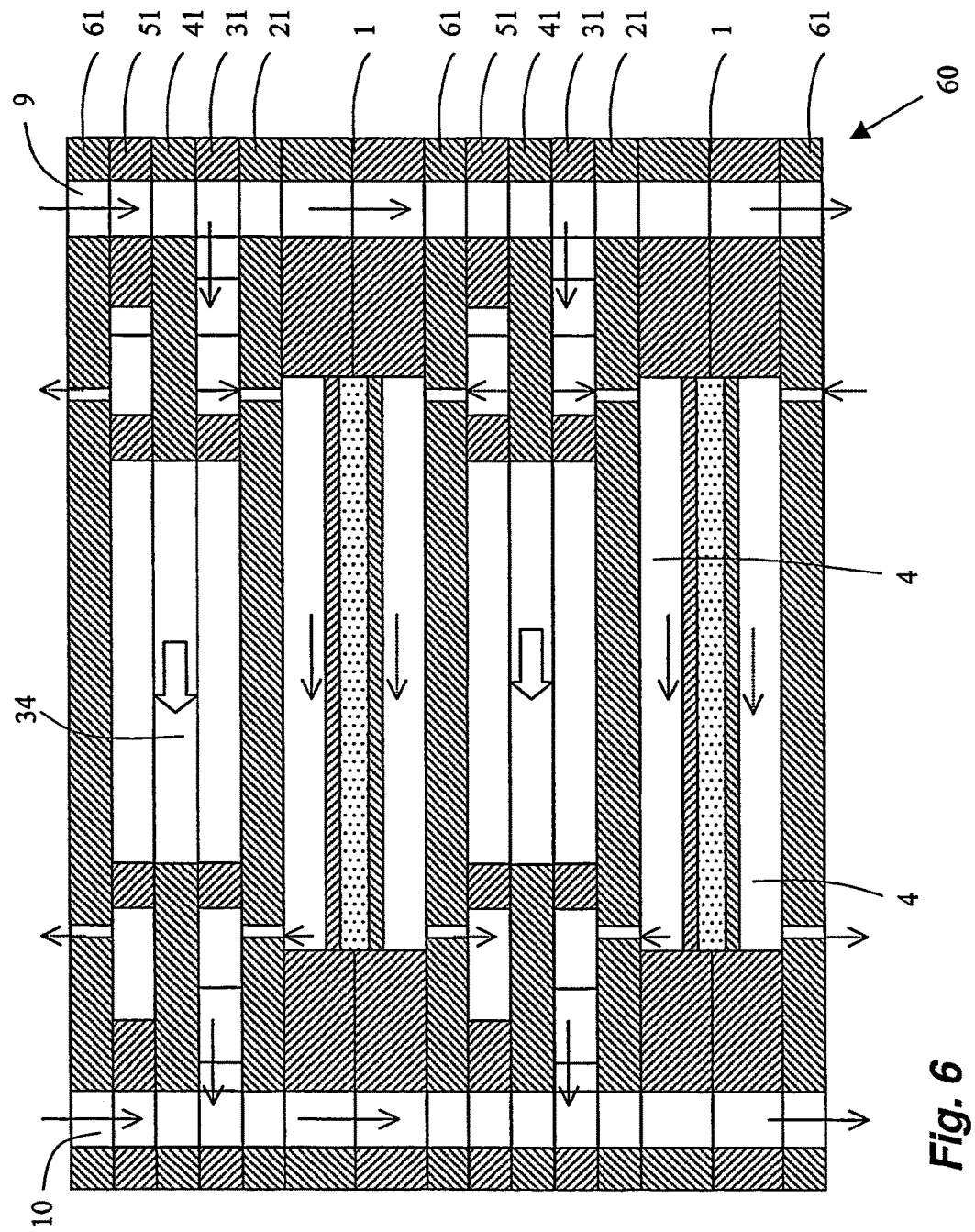
FIG. 6 shows schematically a combination of the layers according to FIGS. 1b, 2b, 3b, 4b and 5b assembled into a layer structure according to the preferred embodiment.

FIG. 6 shows a combination of the layers according to FIGS. 1b, 2b, 3b, 4b and 5b assembled into a layer structure 60 comprising two repeating sequences. FIG. 6 can also be said to show a part of a fuel cell stack, which part comprises two fuel cells which each constitute a layer structure. Starting from the first layer 1 and in the upward direction in FIG. 6, each repeating sequence, that is to say each fuel cell, is constructed as follows: the first layer 1, the second layer 21, the third layer 31, the fourth layer 41, the fifth layer 51, and a sixth layer 61 which in its construction is identical to the second layer 21. The assembled layer structure 60 according to FIG. 6 has a cell space 4 at the active surface 5 in the first layer 1, which cell space 4 is defined by the limiting surfaces: the active surface 5, the distance element 6 and the second layer 21, or alternatively the sixth layer 61 (see also FIGS. 1 and 2). FIG. 6 also shows that the three cooling chambers 34', 34'' and 34''' have now been combined to form a common cooling chamber 34.

The various flows through the layer structure will be described below with the aid of FIGS. 1-6. A number of arrows have been inserted in FIG. 6: narrow, solid arrows represent the first flow, narrow, broken arrows represent the second flow, and broad arrows represent the coolant flow. Fundamentally, it may be said that the first flow contains a first reactant, for example hydrogen or other fuel, and the second flow contains a second reactant, for example oxygen or other oxidizing agent. These two flows are conducted through their respective cell space 4 on either side of each electrolyte 2 in each cell, the desired reactions then taking place, and the content of the flows being changed. The outgoing first and second flows will therefore be depleted of reactants compared with the incoming flows, and at least one of the outgoing flows will contain reaction products, for example water.

The three flows are conducted to and from a fuel cell via the main ducts 7-12. The incoming first flow is conducted from its main duct 9 in to the first distribution chamber 32 in the third layer 31 and onward through the inlet openings 22 in the second layer 21 in to the cell space 4 where it comes into contact with the active surface 5, the desired reactions then taking place. The first flow continues out from the cell space 4 via the outlet openings 23 in to the first collecting chamber 33 and onward out into the main duct for the outgoing first flow 10. By virtue of the fact that the first distribution chamber 32 and the inlet openings 22 are designed to provide a greater flow resistance through the inlet openings 22 than through the first distribution chamber 32, the first flow will be distributed well in the first distribution chamber 32 and thus distributed uniformly over the inlet region 24 (see FIG. 2a) which is defined by the inlet openings 22. FIGS. 1, 2 and 6 in combination show that the inlet region 24 extends along the active surface 5 in a direction which in FIGS. 1a and 2a is in the vertical direction of the figure and in FIGS. 1b, 2b and 6 is orthogonal to the surface of the figure (that is to say of the paper). FIGS. 1a, 2a and 6 show that the inlet region 24 extends along essentially the entire extent of the active surface 5 in the vertical direction and that the inlet region 24 is located adjacent to one of the delimitations of the active surface 5, that is to say in this case adjacent to the distance element 6. The outlet region 25, the outlet openings 23 and the first collecting chamber 33 are arranged in a similar way to that described above for the inlet side. The outlet region 25 is consequently spread out and is located adjacent to a delimitation of the active surface 5 opposite the inlet region 24. The inlet region 24 and the outlet region 25 are also parallel to one another. By virtue of the uniform flow distribution described above over the spread-out inlet region 24 in to the active surface 5, very good opportunities are afforded for utilizing the active surface 5 effectively. By designing the outlet from the active surface 5 as described above, even better opportunities are afforded. These opportunities are described more extensively below in connection with the cell space 4.

The incoming second flow is conducted from its main duct 11 (not shown in FIG. 6) in to the second distribution chamber 52 in the fifth layer 51 and onward through the inlet openings 22 in the sixth layer 61 in to the cell space 4 where it comes into contact with the active surface 5, the desired reactions then taking place. The second flow continues out from the cell space 4 via the outlet openings 23 in to the second collecting chamber 53 and onward out into the main duct for the outgoing second flow 12 (not shown in FIG. 6). The description of the flow resistance, the inlet region 24, the outlet region 25 and the flow distribution etc. is analogous to that described above with regard to the first flow.

The inlet openings 22 and the main ducts for the incoming first and second flows 9, 11 are suitably dimensioned in such a way that the pressure drop across the cell concerned is of such a size that the incoming first and second flows are distributed uniformly over all cells of the stack. This means that the chemical reaction can take place uniformly over the cells, which leads to the cell voltages being uniform and to uniform power development taking place in the stack. In this way, good control over the cell voltages is obtained, which minimizes the risk of some cell voltages falling below a level which is dangerous for the cell and may in turn result in the MEA, and thus the stack, being destroyed. Uniform power development makes it easier to avoid problems with cells which are too hot such as, for example, the membrane drying out and breaking/cracking.

The incoming coolant flow is conducted from its main duct 7 (not shown in FIG. 6), via the connections in the third, fourth and fifth layers 31, 41, 51, in to the common cooling chamber 34 and onward out to the main duct for outgoing coolant 8 (not shown in FIG. 6). As can be seen in FIG. 6, a cooling chamber is located between the second layer 21 and the sixth layer 61 in each repeating sequence. The layer structure 60 consequently allows cooling of each cell in the stack. This provides very good control of the temperature in the stack and means that a uniform temperature distribution can be obtained and that the operating temperature can be kept close to the maximum permitted temperature in order to obtain the maximum possible power. Use is suitably made of a liquid-based coolant such as, for example, water for maximum cooling effect, but it is also possible to use coolants in gas form.

Figure 7:
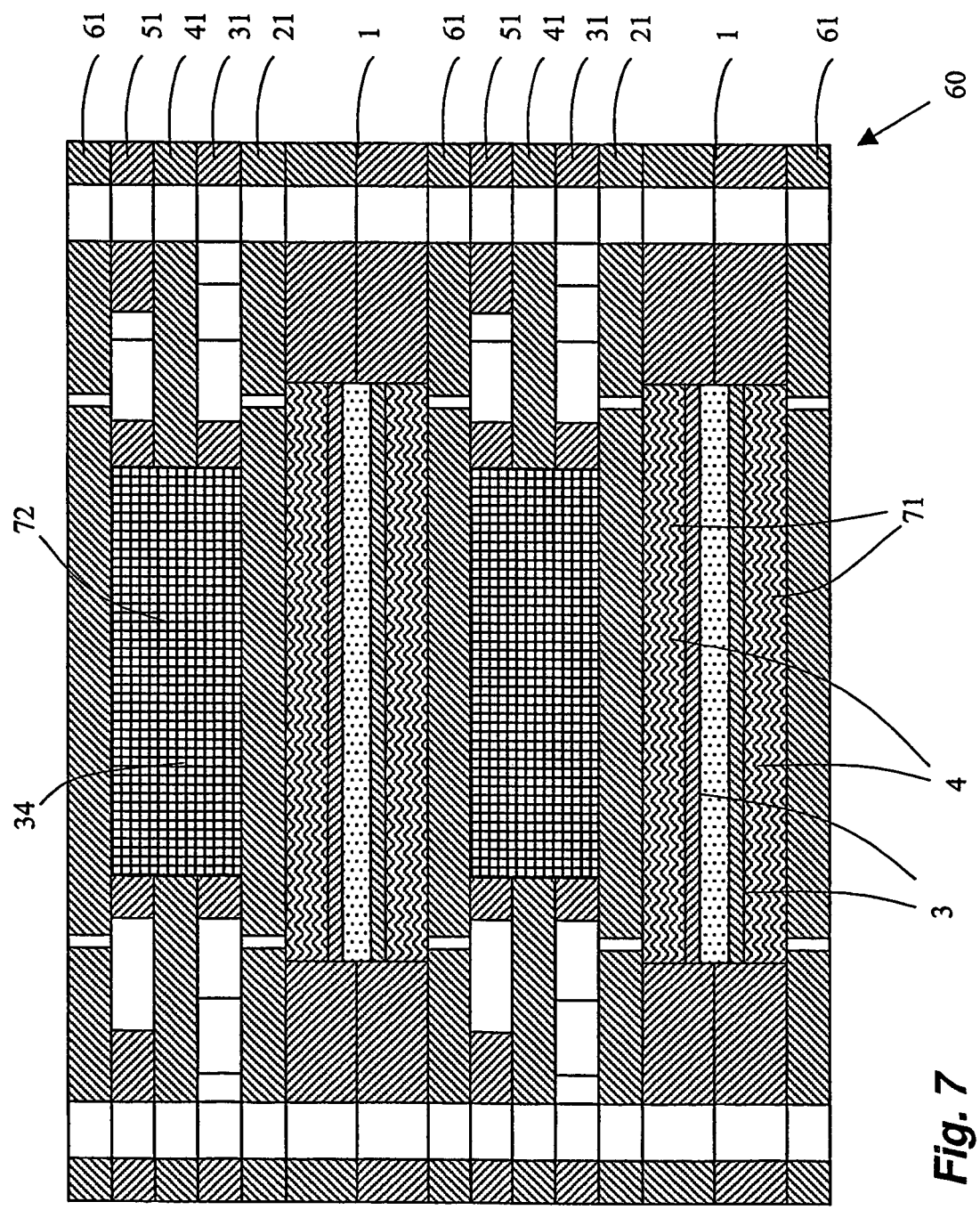
FIG. 7 shows a further improvement of the layer structure according to FIG. 6.

As can be seen from FIGS. 1, 2 and 6, the cell space 4 consists of a homogeneous volume located immediately adjacent to the active surface 5. In accordance with the description above with regard to the inlet region 24 and the outlet region 25, a uniform and good flow pattern is obtained over the entire cell space 4 and thus over the entire active surface 5. In this way, the active surface 5 can be utilized very effectively. In order to conduct electric current between the electrode 3 and the second layer 21 and, respectively, the sixth layer 61, a first conducting means 71 is positioned in each cell space 4, which is shown in FIG. 7. The first conducting means 71 is made at least partly from an electrically conductive material which is preferably well-suited for the chemical environment in the cell space 4. The first conducting means 71 is also preferably designed to increase further the degree of utilization of the active surface 5 by further guaranteeing uniform and good flow distribution over the active surface 5 by, for example, creating turbulence in the flow in the cell space 4 for increased mass transport and thus increased reaction rate. Moreover, the first conducting means 71 suitably has resilient properties in order to ensure good contact over time. The first conducting means 71 preferably consists of a net structure or a folded and perforated plate, but other embodiments are also conceivable.

In order to conduct electric current between the second layer 21 and the sixth layer 61, a second conducting means 72 is positioned in each cooling chamber 34, which is shown in FIG. 7. By analogy with the first conducting means 71, the second conducting means 72 is i) made at least partly of an electrically conductive material which is suitable for the chemical environment, ii) suitably designed to improve the cooling effect by guaranteeing good flow distribution through the cooling chamber 34 by, for example, creating turbulence in the flow in the cooling chamber 34 for increased mass transport, iii) suitably arranged so as to have resilient properties in order to ensure good contact and stability of the stack over time. The contact pressure created in this way between the components included in the fuel cell contributes to uniform flow and voltage distribution between the cells. The second conducting means 72 preferably also consists of a net structure or a folded and perforated plate, but other embodiments are also conceivable.

The conducting means 71, 72 can of course be constructed from a number of parts.

The layer structure 60 according to FIGS. 6 and 7 is symmetrical to such an extent that the first flow can instead by conducted through the ducts and spaces which above were dedicated to the second flow, and vice versa. The flow direction can also be changed for one or some of the three flows described. This can be used, for example, in order to obtain countercurrent flow through the two cell spaces 4 in the first layer 1 so as in this way to increase the concentration differences or partial pressure differences in a favorable way for the reaction rate. Another example is to conduct the coolant flow in the opposite direction to that described above for the purpose of facilitating heat exchange between outgoing coolant flow and incoming reactant flow.

As mentioned previously, it is necessary that a fuel cell stack is sealed to the outside and that the various flows cannot be mixed. In the embodiment described in FIGS. 1-7, the third layer 31, the fifth layer 51 and the distance element 6 consist of a sealing material. In this way, the need for extra layers with a sealing function is eliminated. Sealing layers can of course instead be inserted between one or more of the layers described above. It is also conceivable, for example, for parts of the distance element 6 to consist of sealing material. In the embodiment described, the distribution and collecting chambers 32, 33, 52, 53 and the first and third cooling chambers 34', 34''' consequently constitute through-cutouts in a layer with a sealing function. The second and sixth layers 21, 61 are suitably made of a material which on the one hand is suitable for the chemical environment in the cell space 4 and on the other hand conducts heat well for a good cooling effect, for example a metal. The fourth layer 41 is suitably designed to provide stability for the surrounding sealing layers and can be made of metal. Many different materials are of course conceivable for the various layers.

The number of repeating sequences, that is to say fuel cells, can be varied as desired in the layer structure 60. The stack is finished with an end construction, for example arranged by replacing a fifth layer 51 with a seventh layer (not shown) which is provided with only the through-cutouts 7-13 mentioned previously.

The invention is not limited to the illustrative embodiments described above, but a number of modifications are conceivable within the scope of the patent claims below.

For example, it must be emphasized that the figures are schematic; many modifications are possible for a person skilled-in-the-art, with the description of the preferred embodiment of the invention as a starting point, in order to produce variants of the inlet and outlet regions 24, 25 described. For example, it is possible to modify i) positioning of the main ducts 7-12, ii) positioning and geometrical shape of the distribution, collecting and cooling chambers 32, 33, 34, 34', 34'', 34''', 52, 53, and iii) positioning and geometrical shape of connections between main ducts and chambers. The appearance, geometrical shape and positioning of the inlet and outlet openings 22, 23, as well as of the active surface 5, can also be modified. An example of how, taking FIGS. 1-6 as a starting point, it is possible in a relatively simple manner to produce an inlet region 24 which extends over the entire active surface 5 is to move the main duct for incoming coolant 7 and its connections to the cooling chambers 34', 34'', 34''' further away from the main duct for a first incoming flow 9 (that is to say upward in FIGS. 1-5) in order thus to make possible expansion of the first and second distribution chambers 32, 52 upward in FIG.

3 and FIG. 5 so that the distribution chambers 32, 52 extend along the entire width of the active surface 5. By adding one or more inlet openings 22, an inlet region 24 which extends along the entire active surface 5 can in this way be created. By, in a corresponding way, moving the main duct for outgoing coolant 8 and its connections to the cooling chambers 34', 34", 34'" further away from the main duct for a first outgoing flow 10 (that is to say downward in FIGS. 1-5), expanding the first and second collecting chambers 33, 53 downward in FIG. 3 and FIG. 5 so that they extend along the entire width of the active surface 5, and adding one or more outlet openings 23, an outlet region 25 which extends along the entire active surface 5 can in this way also be created. If one takes the liberty of reducing the size of the electrode 3 and the electrolyte 2, the bottom inlet opening of the inlet openings 22 and the top outlet opening of the outlet openings 23 in FIG. 2a can alternatively be omitted, and the active surface 5 can be adapted according to the width of the inlet and outlet regions 24, 25 then created.

The present invention is preferably intended for fuel cells with gaseous reactants, such as, for example, hydrogen gas and oxygen, but the invention is also well-suited for liquid reactants such as, for example, methanol, petrol etc. The present invention is also well-suited for application to various types of fuel cell with different types of electrode/membrane arrangement.

An alternative to the embodiment described above is to arrange inlets/outlets for all three flows in the third layer 31 and to omit the fourth layer 41 and the fifth layer 51 from the construction. In such an alternative, the third layer 31 will comprise five chambers with associated connections to the respective main ducts: two distribution chambers 32, 52 for the two incoming reactant flows, two collecting chambers 33, 53 for the two outgoing flows, and a cooling chamber 34'. Distribution chambers, inlet openings, outlet openings and collecting chambers can be arranged, for example, in such a way that the inlet and outlet regions 24, 25 extend over approximately half the width of the active surface 5 (so that two inlet/outlet regions are accommodated next to one another) and are positioned so that the flow takes place diagonally over the active surface 5. In this case, the third layer 31 is surrounded by two mirror-inverted variants of the second layer 21 provided with inlet and outlet openings. Alternatively, the inlet and outlet regions 24, 25 can be arranged in such a way that the first flow flows over the active surface 5 in essentially the same way as in the embodiment described above and that the second flow flows over the active surface 5 in a direction which is essentially at right angles relative to the direction of the first flow, that is to say so that the flow is crosswise on the different sides of the electrolyte/the electrodes. In this case, the extension directions of the two distribution chambers, and of the two collecting chambers, for the two flows in the third layer 31 will consequently be at right angles relative to one another. In this case, the third layer 31 will also be surrounded by two variants of the second layer 21: one variant with horizontal inlet/outlet regions and one variant with vertical inlet/outlet regions. However, an advantage of the preferred embodiment described previously is that the fourth layer 41 separates the two flows in an effective manner, which reduces the risk of leakage.

As far as the design of the inlet/outlet regions 24, 25 is concerned, these can alternatively be defined by an elongate opening, for example a slot, instead of a distribution of a number of smaller openings. It is also possible to arrange a number of inlet regions 24 in series, that is to say a second inlet region is arranged downstream in the cell space 4. This makes it possible, for example, to keep the concentration of reactant at a higher level in, seen from the perspective of the flow, the later part of the cell space 4. Such a construction of course requires that the cooling chamber 34' has a different design.

The invention is not limited to the cell space consisting of a homogeneous volume as is shown in, for example, FIG. 6. It is, for example, entirely possible for the active surface 5 not to be let into the first layer 1 and for the cell space to consist of, for example, grooves or slots in an adjacent layer. Alternatively, an insert can be positioned in the cell space 4, which insert is provided with, for example, a number of thin grooves on the side which is positioned against the active surface 5, and which insert is adapted to provide a favorable gas flow from the inlet openings 22, via the active surface 5, to the outlet openings 23. Said insert can consist of a part incorporated in the second layer 21, such as a convexity which fits in the cell space. In such cases as well, it is advantageous for a flow incoming to the active surface 5 to be distributed uniformly over an inlet region which extends along the active surface 5. For example, the design of the grooves can be simplified by making them parallel, which simplifies manufacturing.

Furthermore, the invention is not limited to a conducting means 71 being positioned at the active surface 5 in the cell space 4 in order to conduct the electric current. An alternative is to conduct the current via material adjacent to the delimitations of the active surface 5. Another alternative is for the surface which faces the active surface, and which thus constitutes one of the limiting surfaces of the cell space, to have such a three-dimensional structure that electric contact is obtained over the cell space 4. Examples of such a structure are that the surface is provided with pins of some form or that the surface is very rough, or that the surface consists of some other pattern which distributes a flow well over the active surface.

The shape of the cell/the stack can also be varied; for example, the cell/the stack can have a cylindrical design. The active surface 5 can also have a geometrical shape other than the rectangular shape shown.

As far as the various layers in the layer structure 60 are concerned, they can of course be of different thickness, and, furthermore, they do not necessarily have to be held together only by bolts through bolt holes 13; some of the layers can, for example, be joined together by means of other fastening methods such as, for example, gluing, soldering and welding, or be integrated in another way.

In a variant of the invention, the first distribution chamber 32 and the first collecting chamber 33 with associated connections can be created by cavities in the second layer 21 and/or the fourth layer 41. For example, these cavities can have the same fundamental form as shown in FIG. 3a. In contrast to the embodiment described above, in which these first chambers 32, 33 are located in the third layer 31, they will in this variant be located in the second layer 21 and/or the fourth layer 41. By ensuring that the second and fourth layers 21, 41 are sealed in relation to one another, either by selecting suitable layer material or by providing one layer or both layers with a suitable surface layer, the third layer 31 can thus be eliminated from the construction. In the same way, the second distribution chamber 52 and the second collecting chamber 53 can be created by cavities in the fourth layer 41 and/or the sixth layer 61 with the result that the fifth layer 51 can also be eliminated from the construction provided sealing is provided between the fourth and sixth layers 41, 61. In this way, the total number of layers in the layer structure 60 can be reduced to four per repeating sequence: the first layer 1, the second layer 21, the fourth layer 41 and the sixth layer 61. An advantage of this variant of the invention is that a smaller number of layers affords advantages in terms of fit when the layer structure/the fuel cell stack is assembled. Further advantages are that a smaller number of layers can make the whole construction more compact and that the number of points where leakage can occur is reduced. In this variant of the invention, cooling is obtained via the cooling chamber 34" positioned in the fourth layer 41. As in the embodiment described above, the fourth layer 41 also functions as a separator layer which prevents leakage between the first and second flows. In a similar way to the embodiment described above, the second layer 21 will constitute a delimitation between the cell space 4 and the distribution chamber 32 and the collecting chamber 33, and allow communication therebetween via the inlet openings 22 and, respectively, the outlet openings 23. Moreover, as previously, the second layer 21 constitutes a delimitation between the cell space 4 and the cooling chamber 34".

The chambers 32, 33, 52, 53 can of course also consist of a combination of through-cutouts in the third layer 31 and, respectively, the fifth layer 51, and cavities in the second layer 21 and/or the fourth layer 41 and, respectively, in the fourth layer 41 and/or the sixth layer 61.

In accordance with the above examples according to the invention, the distribution chamber 32, 52 is therefore formed between different layers when the layer structure 60 is assembled. The limiting surfaces of the distribution chamber 32, 52 consist of on the one hand the second layer 21 and on the other hand one or more further layers: either "the walls" in the through-cutout of the third layer 31 and the fourth layer 41, or, if the distribution chamber 32, 52 consists of a cavity, the fourth layer 41. The collecting chamber 33, 53 is also formed in a corresponding way. The cooling chamber 34 is also formed when the layer structure 60 is assembled, and, in this case as well, the second layer 21 constitutes a limiting surface for the inner hollow formed. In accordance with the above examples according to the invention, use is therefore made of an ingenious layer structure 60 where various layers in interaction form different types of space such as ducts and chambers. By using relatively thin layers, manufacturing can be simplified by, for example, punching instead of, for example, drilling being used for forming the various spaces. Furthermore, said layer structure 60 is relatively easy to modify during, for example, test-running/adaptation compared with a more solid construction because individual layers can be demounted and adapted or exchanged.

The invention claimed is:

1. A fuel cell comprising
an electrolyte provided with electrodes in the form of an anode and a cathode on opposite sides of the electrolyte,
a cell space formed as a single volume at least partially defined by at least one of an anode active surface and a cathode active surface, the anode active surface and the cathode active surface being planar, and
a system of flow ducts comprising
a distribution arrangement configured to distribute a flow incoming to the cell space uniformly via an inlet region leading only into the cell space, and
a collecting arrangement configured to allow a flow outgoing from the cell space to leave the cell space via an outlet region separate from the inlet region, and wherein at least one of the inlet region and the outlet region extends across at least half of an extent of the at least one of the anode active surface and the cathode active surface,
wherein the distribution arrangement comprises
a distribution chamber which extends along the at least one of the anode active surface and the cathode active surface, and
at least one inlet opening which allows flow from the distribution chamber to the at least one of the anode active surface and the cathode active surface, the at least one inlet opening defining the inlet region, and
wherein the fuel cell is formed of a layer structure comprising
a first layer in which the at least one of the anode active surface and the cathode active surface is located,
a second layer provided with the at least one inlet opening, and
at least one further layer, where the second layer is located between the first layer and the at least one further layer, the second layer and the at least one further layer at least partly defining limiting surfaces for the distribution chamber,
wherein
the at least one further layer comprises a third layer and a fourth layer,
the distribution chamber comprises at least partly a through-cutout in the third layer,
the second layer at least partly defines a limiting surface for the distribution chamber in one direction, and
the fourth layer at least partly defines a limiting surface for the distribution chamber in a direction opposite the one direction,
wherein flow forming the incoming flow
entirely flows from a main duct, the flow being in a first direction in the main duct, into the distribution chamber in the third layer, the flow from the main duct into and through the distribution chamber being in a second direction, the second direction being perpendicular to the first direction,
entirely flows onward through the at least one inlet opening in the second layer into the cell space in the first direction to become the incoming flow, the flow coming into contact with the active surface in the cell space,
entirely flows through the cell space in the second direction perpendicular to the first direction, and becomes the outgoing flow as the flow entirely exits the cell space via the outlet region in a third direction opposite the first direction.

2. The fuel cell as claimed in claim 1, wherein the inlet region extends along at least half of an extent of the at least one of the anode active surface and the cathode active surface.

3. The fuel cell as claimed in claim 1, wherein the inlet region is located adjacent to a delimitation of the at least one of the anode active surface and the cathode active surface.

4. The fuel cell as claimed in claim 1, wherein the outlet region extends along at least half of the at least one of the anode active surface and the cathode active surface.

5. The fuel cell as claimed in claim 1, wherein the outlet region is located adjacent to a delimitation of the at least one of the anode active surface and the cathode active surface opposite the inlet region.

6. The fuel cell as claimed in claim 1, wherein the inlet region and the outlet region are substantially parallel to one another.

7. The fuel cell as claimed in claim 1, wherein the collecting arrangement comprises
a collecting chamber which extends along the at least one of the anode active surface and the cathode active surface, and
at least one outlet opening which allows flow from the at least one of the anode active surface and the cathode active surface to the collecting chamber, the at least one outlet opening defining the outlet region.

8. The fuel cell as claimed in claim 1, wherein the at least one inlet opening provides greater flow resistance than through the distribution chamber.

9. The fuel cell as claimed in claim 1, wherein the active surface extends essentially in a first plane and wherein the distribution chamber extends essentially in a second plane, which second plane is essentially parallel to the first plane and is located at a distance from the first plane, and wherein the distribution chamber extends at least partly over a region to which, in the first plane, the at least one of the anode active surface and the cathode active surface corresponds.

10. The fuel cell as claimed in claim 1, wherein the distribution chamber comprises at least partly a cavity in the second layer.

11. The fuel cell as claimed in claim 1, wherein the distribution chamber comprises at least partly a cavity in the at least one further layer.

12. The fuel cell as claimed in claim 1, wherein the third layer comprises at least one distribution chamber, at least one collecting chamber and at least one cooling chamber.

13. The fuel cell as claimed in claim 12, wherein the second layer at least partly defines a delimitation for the distribution chamber, the collecting chamber and the cooling chamber in one direction, and wherein the fourth layer at least partly defines a delimitation for at least the distribution chamber and the collecting chamber another direction.

14. The fuel cell as claimed in claim 13, wherein the system of flow ducts is arranged so as to bring a first flow containing a first reactant into contact with the anode active surface and to bring a second flow containing a second reactant into contact with the cathode active surface, and wherein the distribution chamber and the collecting chamber in the third layer are intended for the first flow, and wherein the fuel cell comprises a fifth layer provided with a second distribution chamber and a second collecting chamber, which second chambers are intended for the second flow.

15. The fuel cell as claimed in claim 1, wherein the second layer at least partly defines a delimiting surface in the cell space at the at least one of the anode active surface and the cathode active surface, and wherein the second layer at least partly defines a delimitation between the cell space and the distribution chamber, and wherein the second layer is provided with at least one opening, which at least one opening allows communication between the distribution chamber and the cell space and forms the at least one inlet opening.

16. The fuel cell as claimed in claim 15, wherein the second layer is located at a distance from the at least one of the anode active surface and the cathode active surface.

17. The fuel cell as claimed in claim 16, wherein the cell space is provided with a conductor configured to conduct electric current between the electrode and the second layer.

18. The fuel cell as claimed in claim 17, wherein the conductor is resilient.

19. The fuel cell as claimed in claim 17, wherein the conductor provides a flow pattern close to the at least one of the anode active surface and the cathode active surface.

20. The fuel cell as claimed in claim 17, wherein the conductor comprises a net structure.

21. The fuel cell as claimed in claim 1, wherein the system of flow ducts comprises a coolant distribution system, and wherein a cooling chamber is arranged in the at least one further layer.

22. The fuel cell as claimed in claim 21, wherein the cooling chamber comprises at least partly a through-cutout in the at least one further layer, and wherein the second layer at least partly defines a limiting surface for the cooling chamber.

23. The fuel cell as claimed in claim 21, wherein the cooling chamber is provided with a conductor configured to conduct electric current through the cooling chamber.

24. The fuel cell as claimed in claim 23, wherein the conductor is resilient.

25. The fuel cell as claimed in claim 23, wherein the conductor provides a flow pattern for increased cooling effect relative to a cooling effect with no conductor.

26. The fuel cell as claimed in claim 23, wherein the conductor comprises a net structure.

27. The fuel cell as claimed in claim 1, wherein the distribution arrangement is configured to distribute a flow incoming to both the anode active surface and the cathode active surface.

28. A fuel cell stack, comprising a plurality of fuel cells, wherein at least one of the fuel cells is constructed according to claim 1.

29. A fuel cell comprising
an electrolyte provided with electrodes in the form of an anode and a cathode on opposite sides of the electrolyte,
a cell space formed as a single layer of volume at least partially defined by at least one of an anode active surface and a cathode active surface, the anode active surface and the cathode active surface being planar, and
a system of flow ducts comprising
a distribution arrangement configured to distribute a flow incoming to the cell space uniformly via an inlet region leading only into the cell space, and
a collecting arrangement configured to allow a flow outgoing from the cell space to leave the cell space via an outlet region separate from the inlet region, and
wherein at least one of the inlet region and the outlet region extends across at least approximately half of an extent of the at least one of the anode active surface and the cathode active surface,
wherein the distribution arrangement comprises
a distribution chamber which extends along the at least one of the anode active surface and the cathode active surface, and
at least one inlet opening which allows flow from the distribution chamber to the at least one of the anode active surface and the cathode active surface, the at least one inlet opening defining the inlet region, and
wherein the fuel cell is formed of a layer structure comprising
a first layer in which the at least one of the anode active surface and the cathode active surface is located,
a second layer provided with the at least one inlet opening, and
at least one further layer, where the second layer is located between the first layer and the at least one further layer, the second layer and the at least one further layer at least partly defining limiting surfaces for the distribution chamber, wherein
the at least one further layer comprises a third layer and a fourth layer,
the distribution chamber comprises at least partly a through-cutout in the third layer,
the second layer at least partly defines a limiting, surface for the distribution chamber in one direction, and
the fourth layer at least partly defines a limiting surface for the distribution chamber in a direction opposite the one direction,
wherein flow forming the incoming flow
entirely flows from a main duct, the flow being in a first direction in the main duct, into the distribution chamber in the third layer, the flow from the main duct into and through the distribution chamber being in a second direction, the second direction being perpendicular to the first direction,
entirely flows onward through the at least one inlet opening in the second layer into the cell space in the first direction to become the incoming flow, the incoming flow coining into contact with the active surface in the cell space,
entirely flows through the cell space in the second direction perpendicular to the first direction, and
becomes the outgoing flow as the flow entirely exits the cell space via the outlet region in a third direction opposite the first direction.

* * * * *